(12) United States Patent
Mattis et al.

(10) Patent No.: US 6,834,153 B1
(45) Date of Patent: Dec. 21, 2004

(54) BEZEL PRISMATIC LIGHTPIPE DESIGN

(75) Inventors: James Mattis, Sunnyvale, CA (US); David J. Baik, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 10/218,757

(22) Filed: Aug. 14, 2002

(51) Int. Cl.⁷ .................................................. G02B 6/10
(52) U.S. Cl. ...................... 385/132; 385/129; 385/31; 385/36; 385/47; 385/136
(58) Field of Search ........................... 385/14, 31, 18, 385/24, 42, 46, 129, 130, 131, 132, 36, 47, 15, 39, 136, 137, 32, 146

(56) References Cited

U.S. PATENT DOCUMENTS

| | | | |
|---|---|---|---|
| 5,305,401 A | * | 4/1994 | Becker et al. ................ 385/24 |
| 5,604,837 A | * | 2/1997 | Tanaka ........................ 385/147 |
| 5,774,608 A | * | 6/1998 | Allen et al. ................... 385/39 |
| 5,812,693 A | * | 9/1998 | Burt et al. ................... 382/149 |
| 5,812,713 A | * | 9/1998 | Allen et al. ................... 385/39 |
| 6,134,359 A | * | 10/2000 | Keyworth et al. ............ 385/33 |
| 6,542,658 B2 | * | 4/2003 | Takeuchi et al. .............. 385/18 |

* cited by examiner

*Primary Examiner*—Brian M. Healy
(74) *Attorney, Agent, or Firm*—Suiter West PC LLO

(57) ABSTRACT

The present invention is directed to a method and system for the efficient transmission of electromagnetic radiation through a channel. An electromagnetic radiation guide of the present invention may include an optical channel having a refractive and transmissive index capable of guiding electromagnetic radiation through the guide. The electromagnetic radiation guide may also include an optical prismatic section capable of redirecting electromagnetic waves to allow increased light transmission by reducing losses from refracted light rays.

10 Claims, 4 Drawing Sheets

BEZEL PRISMATIC LIGHTPIPE DESIGN

FIELD OF THE INVENTION

The present invention generally relates to the field of electromagnetic radiation transmission, and more particularly to a method and system for transmitting light through a multiple channel guide.

BACKGROUND OF THE INVENTION

Well known to the art, lightpipes are used to transmit light from a first location to a second location. Transmission performance is dependent upon the frequency of light being transmitted through the lightpipe, the absorption of light energy in the lightpipe medium, and the loss of light energy from refraction as light rays intersect the boundary of the lightpipe medium. Snell's Law of Refraction states that a light ray traveling through a media that is incident on the media boundary will be partially reflected and partially refracted, or transmitted through the media boundary.

Conventional lightpipe designs utilized in electrical and computer equipment use curved channels molded out of plastic or glass as shown in FIG. 1. Referring to FIG. 1, input light is transmitted through a channel, such as a lightpipe. When the input light reaches the interface between air and the lightpipe media, typically glass or plastic, a refracted ray is transmitted outside of the lightpipe along with a reflected ray that continues to travel down the lightpipe. The light of the refracted ray is lost, causing a reduction of signal strength at the end of the lightpipe. Therefore, the transmitted light will be the quantity of input light less absorption losses through the length of the lightpipe and additional losses from the refracted light. This will result in a dimming of the output light. Additionally, the refracted light may intersect adjacent channels, which may increase crosstalk between multiple channels. Consequently, a method and system of transmitting light through lightpipes without incurring refracted light losses is necessary.

SUMMARY OF THE INVENTION

Accordingly, the present invention is directed to a method and system for the efficient transmission of electromagnetic radiation through a channel. In an embodiment of the invention, an electromagnetic radiation guide may include an optical channel having optical properties sufficient to allow electromagnetic radiation to travel through the length of the guide. The electromagnetic radiation guide may also include an optical prismatic section capable of redirecting the light to a desired location.

It should be understood that both the forgoing general description and the following detailed description are explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by referring to the accompanying figures in which.

DETAILED DESCRIPTION OF THE INVENTION

Reference will now be made in detail to the presently preferred embodiments of the invention, examples of which are illustrated in the accompanying drawings.

Figure 1:
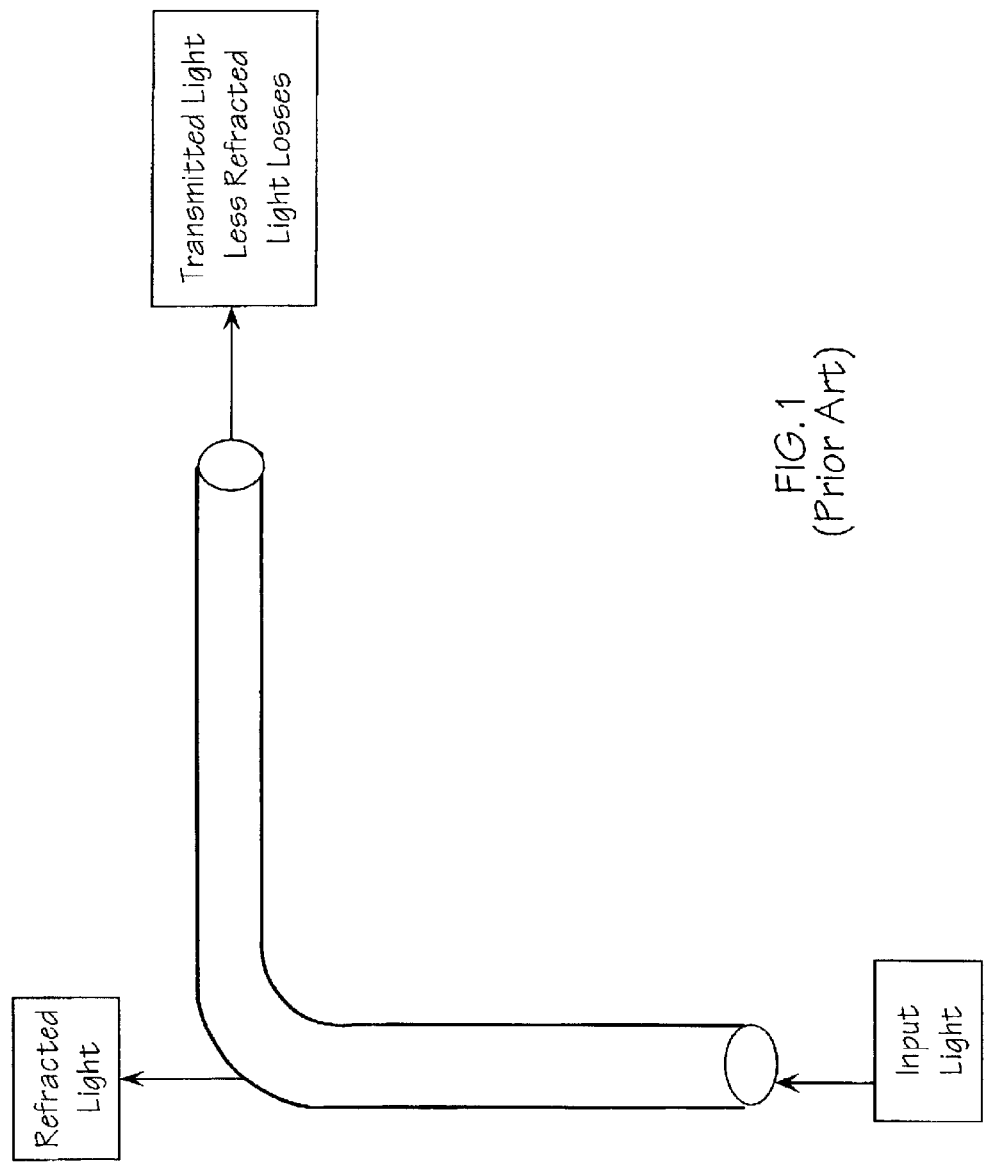
FIG. 1 is an embodiment of a lightpipe known to the art depicting the decreased output due to refracted light losses.
Figure 2:
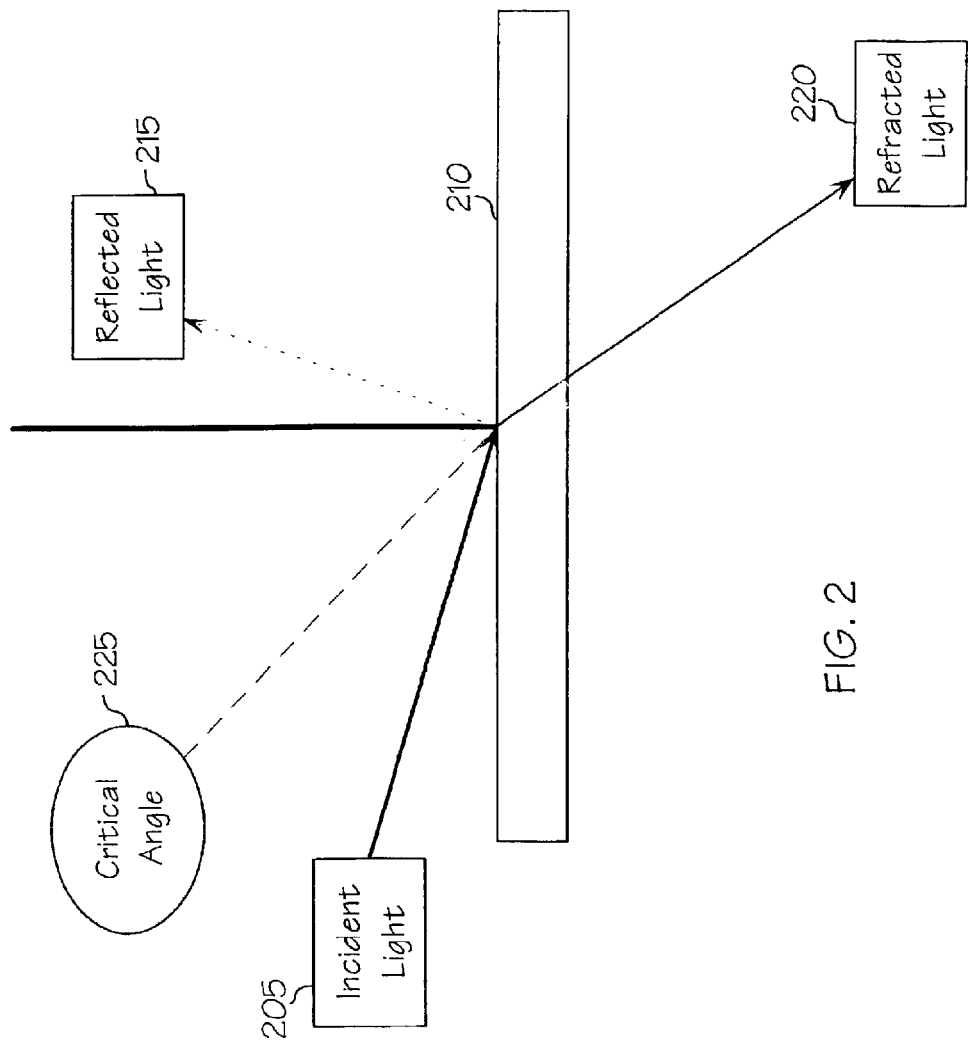
FIG. 2 depicts an illustration of a reflected light ray and refracted light ray when an incident light ray strikes the boundary surface between two different media.

Referring to FIG. 2, an illustration of a reflected light ray and refracted light ray when an incident light ray strikes a boundary surface of two different media is shown. When an incident light ray 205 strikes a boundary 210 between two different media, a reflected light ray 215 and a refracted light ray 220 are produced when the incident light ray 205 is at an angle less than a critical angle 225. This result is the commonly known Snell's Law of Refraction.

In an embodiment of the present invention, an electromagnetic radiation guide is constructed in such a fashion that when an incident light ray strikes a boundary between two different media, the incident light ray is totally reflected. In an embodiment of the present invention, light may be transmitted through a lightpipe such that all light rays incident with the boundary surfaces of the lightpipe intersect the boundary surfaces at an angle greater than the critical angle. This may be advantageous as it allows greater transmission efficiency due to the reduction of light energy losses through refraction.

Figure 3:
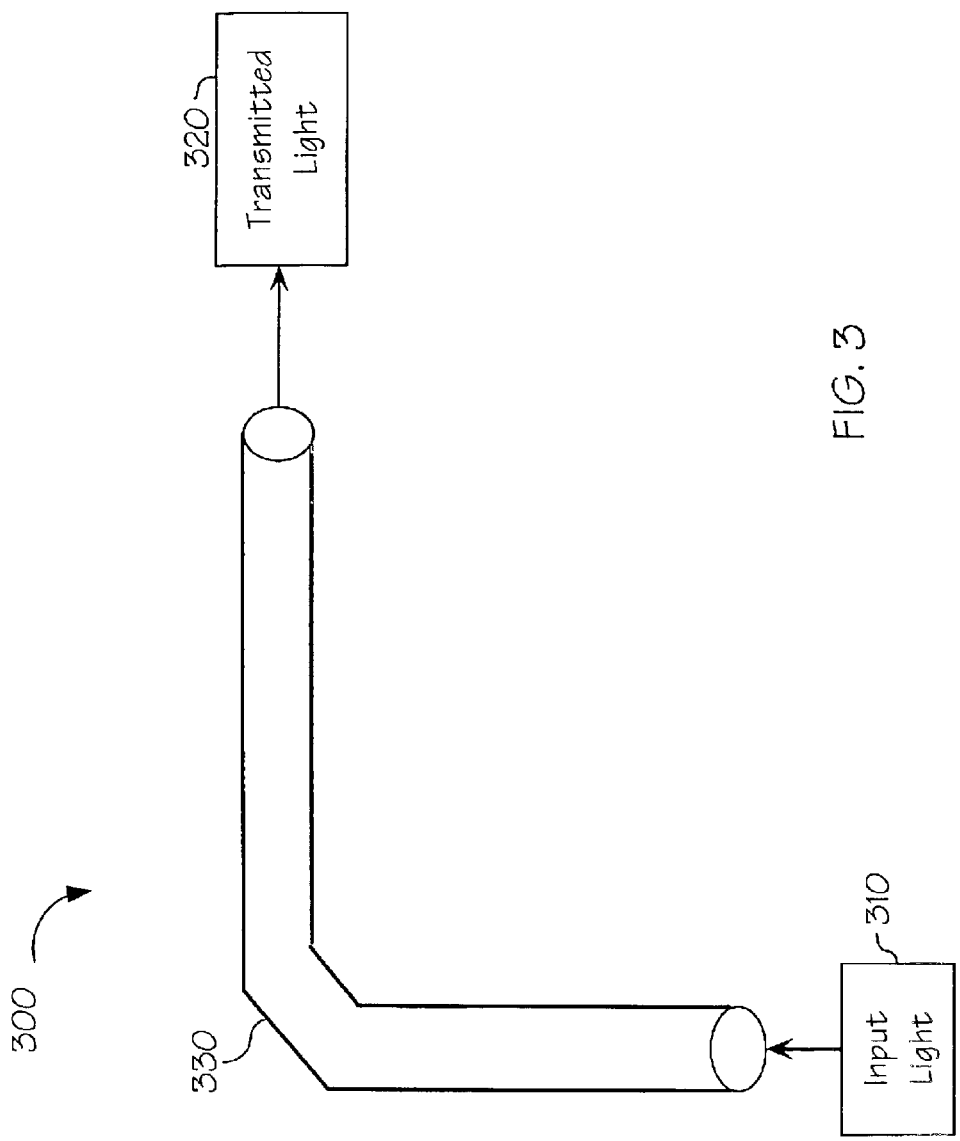
FIG. 3 depicts an electromagnetic radiation guide in accordance with an embodiment of the present invention.

Referring now to FIG. 3, an electromagnetic radiation guide 300 in accordance with an embodiment of the present invention is shown. In one embodiment of the invention, an electromagnetic radiation guide 300 may be capable of transferring light from an optical input to an optical output. An advantage of the electromagnetic radiation guide of the present invention is its ability to maximize the amount of light transmitted from an input source to a desired location. In one embodiment of the invention, channel 300 may include a medium with optical properties allowing it to transmit electromagnetic radiation and a prismatic section 330 that may provide total internal reflection of incident light 310 to minimize light loss as it travels through the channel 300. For example, channel 300 may be constructed with a material having a refractive and transmissive index capable of transmitting electromagnetic radiation.

Prismatic section 330 may be set at an angle to the optical channel operable to change the direction of a light ray. In one embodiment of the invention, the prismatic section 330 may include a material with a high index of refraction. Consequently, light that may strike the boundary of the prismatic section may be reflected. Those with ordinary skill in the art should understand that the optimal angle for prismatic section 330 may depend upon the critical angle required for total internal reflection. The critical angle for total internal reflection is dependent upon the index of refraction for the first media and the index of refraction for the second media. For example, glass has an index of refraction of approximately 1.50. Air has an index of refraction of 1.00. In such an example, the critical angle would be approximately 42 degrees. Consequently, the prismatic section 330 may be designed so that input light will be incident to the prismatic section 330 at an angle greater than the critical angle of 42 degrees. However, the angle of the prismatic section 330 may be modified as required by the media interface to accommodate different materials such as plastic in air, glass in water, glass in air, and the like to insure that all light is totally reflected internally.

Figure 4:
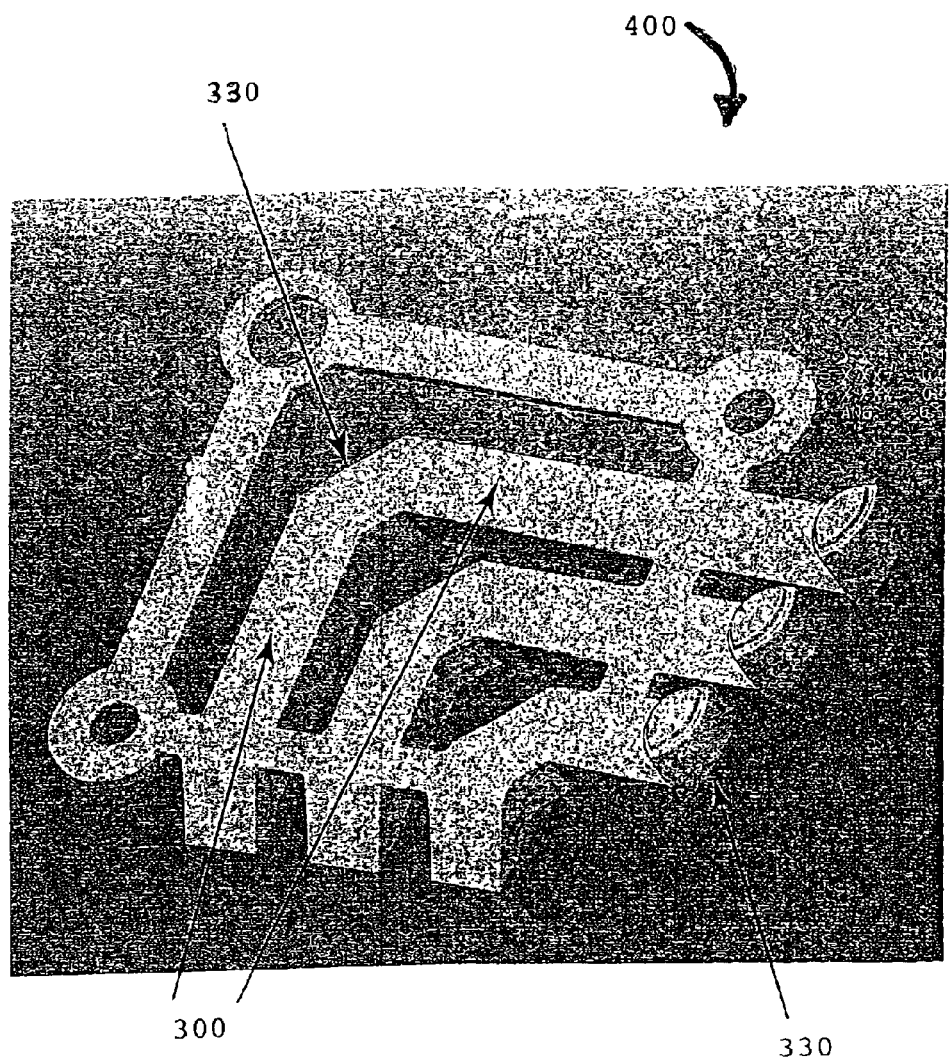
FIG. 4 depicts a multiple channel guide in accordance with an embodiment of the present invention.

Referring now to FIG. 4, a multiple channel guide 400 in accordance with an embodiment of the present invention. In one embodiment of the invention, multiple channel guide 400 may transmit electromagnetic radiation, such as light, from multiple light sources located on the chassis of a piece of electrical equipment, to the outside surface of a bezel attached to the chassis. Multiple channel guides 400 may utilize a plurality of channels 300 and prismatic sections 330 as shown in FIG. 3.

An advantage of the multiple channel guide 400 of the present invention is the ability to transmit multiple channels of light across a distance without crosstalk. Crosstalk occurs when the light signal in one channel interacts with the light signal in another channel. When refracted light rays leave one channel, they can intersect another channel in a multiple channel lightpipe, and modify the light signal in the second channel by increasing or decreasing the light received at the output end of the channel. In accordance with the present invention, light in the channels 300 of multiple channel guide 400 undergoes total internal reflection, thus light is not refracted. Therefore, crosstalk between channels is eliminated.

Another benefit of the multiple channel guide 400 is the ability of the prismatic sections 330 to provide smaller turning radii than traditional curved wave-guides. Prismatic sections 330 change the direction of electromagnetic radiation in a fashion that allows a channel to bend at a greater angle than wave-guides of the prior art. This is beneficial as it may reduce the space occupied by a multiple channel guide 400 of the present invention. For example, light may be transmitted across a bending path with a multiple channel guide 400 that is smaller, and hence less expensive, than curved wave guides known to the art.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form of the invention described previously in this patent application is merely an explanatory embodiment of the invention. It is the intention of the following claims to encompass and include any such changes.

What is claimed is:

1. A light guide for transferring light within electrical equipment, comprising:
    (a) a frame, said frame including apertures whereby fasteners are receivable, said frame being suitable for mounting within a piece of electrical equipment;
    (b) a plurality of optical channels constructed from a material with a refractive and transmissive index capable of transmitting light, with each optical channel including:
        an optical input coupled to a light source within said piece of electrical equipment; and
        an optical output coupled to an outside surface of a bezel of said piece of electrical equipment; and
    (c) at least one optical prismatic section for each channel of the plurality of optical channels, said at least one optical prismatic section set an angle incident said optical channel operable to change the direction of light such that light is totally reflected within said optical channel so as to substantially prevent crosstalk among the plurality of optical channels.

2. The light guide as claimed in claim 1, wherein each optical channel is constructed from at least one of glass or plastic.

3. The light guide as claimed in claim 1, wherein at least one optical prismatic section provides a smaller turning radius then required to support total internal reflection of light in a curved section.

4. The light guide as claimed in claim 3, wherein the smaller turning radius of at least one optical prismatic section reduces space occupied by said light guide.

5. A light guide for transferring light within electrical equipment, comprising:
    a frame, said frame suitable for mounting within a piece of electrical equipment;
    a plurality of optical channels, each of said plurality of channels being parallel to others of said plurality of channels, each of said plurality of optical channels constructed from a material with a refractive and transmissive index capable of transmitting light, with each optical channel including:
        an optical input coupled to a light source within said piece of electrical equipment; and
        an optical output coupled to an outside surface of a bezel of said piece of electrical equipment; and
    at least one optical prismatic section for each channel of the plurality of optical channels, said at least one optical prismatic section set an angle incident said optical channel operable to change the direction of light such that light is totally reflected within said optical channel so as to substantially prevent crosstalk among the plurality of optical channels.

6. The light guide as claimed in claim 5, wherein each optical channel is constructed from at least one of glass or plastic.

7. The light guide as claimed in claim 5, wherein at least one optical prismatic section provides a smaller turning radius then required to support total internal reflection of light in a curved section.

8. A light guide for transferring light within electrical equipment, comprising:
    a frame, said frame including apertures whereby fasteners are receivable, said frame being suitable for mounting within a piece of electrical equipment;
    a plurality of optical channels, each of said plurality of channels being parallel to others of said plurality of channels, each of said plurality of optical channels constructed from a material with a refractive and transmissive index capable of transmitting light, with each optical channel including:
        an optical input coupled to a light source within said piece of electrical equipment; and
        an optical output coupled to an outside surface of a bezel of said piece of electrical equipment; and
    at least one optical prismatic section for each channel of the plurality of optical channels, said at least one optical prismatic section set an angle incident said optical channel operable to change the direction of light such that light is totally reflected within said optical channel so as to substantially prevent crosstalk among the plurality of optical channels.

9. The light guide as claimed in claim 8, wherein each optical channel is constructed from at least one of glass or plastic.

10. The light guide as claimed in claim 8, wherein at least one optical prismatic section provides a smaller turning radius then required to support total internal reflection of light in a curved section.

* * * * *